Oct. 21, 1947.  A. N. LAPPIN ET AL  2,429,206
RETRACTABLE LANDING GEAR
Filed Nov. 3, 1944  2 Sheets-Sheet 1

INVENTOR.
ARTHUR N. LAPPIN
ALLAN E. BJERKE
BY George F. Goodyear
ATTORNEY

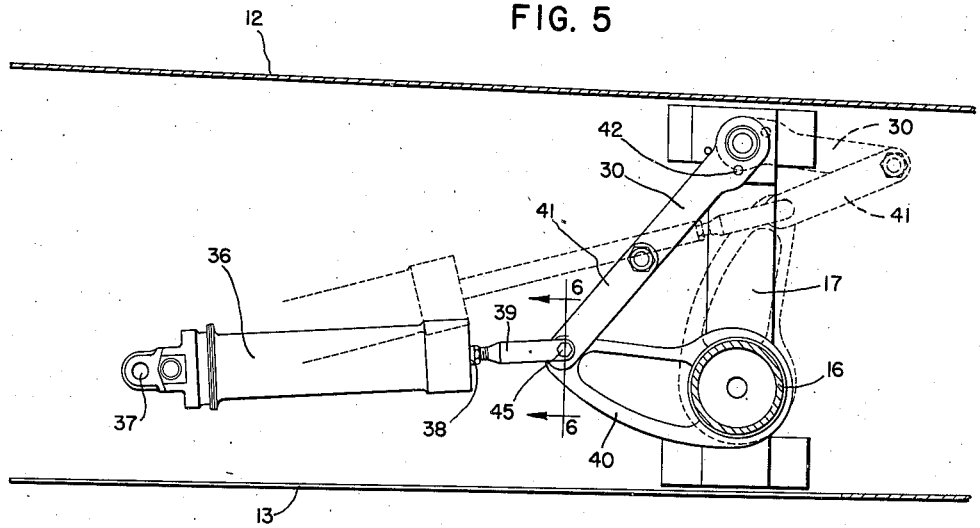
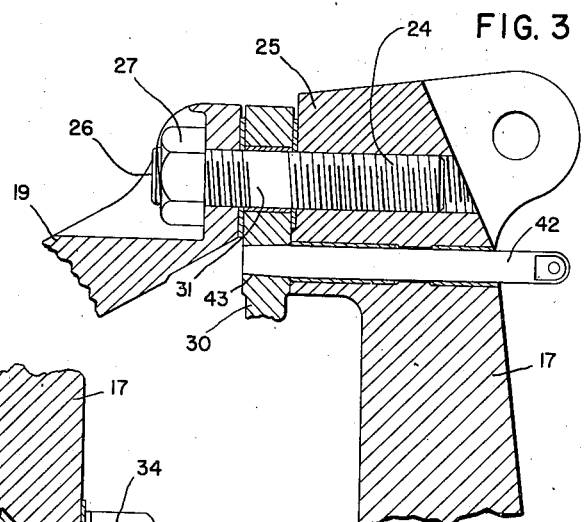
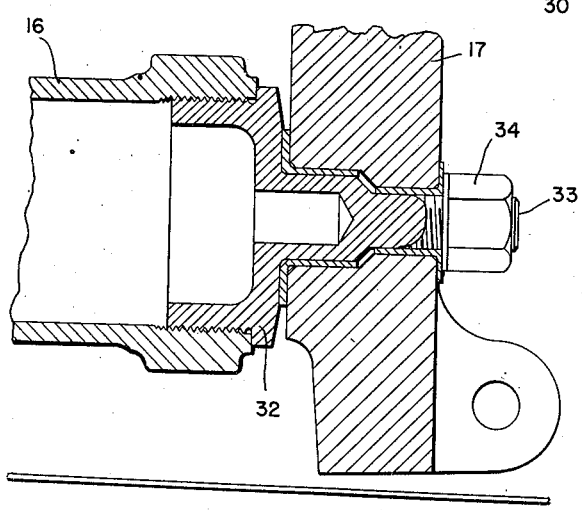

Patented Oct. 21, 1947

2,429,206

UNITED STATES PATENT OFFICE 2,429,206

RETRACTABLE LANDING GEAR

Arthur N. Lappin, Buffalo, and Allan E. Bjerke, Snyder, N. Y., assignors to Curtiss-Wright Corporation, a corporation of Delaware Application November 3, 1944, Serial No. 561,697

12 Claims. (Cl. 244—102)

This invention relates to aircraft landing gears and more particularly to an improved arrangement for retractable landing gears.

An object hereof resides in the provision of a cantilevered type of retractable landing gear which is of full floating construction and hence requires little or no additional structure in the nose section of the wing thus resulting in an extremely light weight, clean and efficient installation.

A further object resides in the provision of a stabilizer means disposed between the landing gear strut and a wing nose beam, the means acting to transfer into the nose beam only such landing gear side loads as are required to maintain the gear alignment when in the extended position during movement of the aircraft on the ground or when landing and taking off.

A still further object resides in the arrangement of the stabilizer means which will rotate upon retraction of the landing gear and hence carry only vertically directed loads whereby the gear installation can be utilized to support the wing nose beam in flight and thus eliminate the need for a heavy nose rib as is required in the more conventional landing gear installations.

In carrying out these and other objects of the present invention the preferred arrangement is embodied in an aircraft wing structure having a main spar or beam of substantial proportions and capable of carrying the major portion of the air loads as well as the support of the aircraft on the ground. A wing nose beam then of relatively simple construction can be utilized principally for strengthening the leading edge of the wing against air loads. The retractable landing gear is mounted on the main beam through a full floating cantilever structure which is designed to take all vertical and drag loads transmitted thereto through the shock strut. The side loads on this gear are taken partly by a fixed side brace and partly through a stabilizing link pivotally connected and disposed between the upper end of the shock strut and the wing nose beam. More importantly the torque created by landing gear side thrust is passed into the main spar through a torque shaft and the linkage and crank system which is utilized to effect retraction and extension of the gear. Thus the improvement hereof resides in permitting one member of a cantilever truss to rotate whereby to establish a folding axis for the gear and also in resisting torque, due to gear side loads, through the gear actuating system.

Upon retraction of the landing gear into a wing pocket the swinging of the main strut into a substantially horizontal position also swings the stabilizer link means in such a manner as to carry its pivotal or articulated connection with the main strut into a substantially vertical position. In this new position the cantilever support for the gear becomes an additional and effective rib-like member through its connection with the front beam by way of the link means whereby the front or nose beam can be strengthened to withstand the air loads. This arrangement has proved of great value in adding strength to that section of the nose beam which extends along and defines the forward portion of the housing for the landing gear. Here again loads acting on the gear in a direction along the length of the main strut cannot be transferred to the nose beam due to the pivoting reaction of the stabilizing link.

The link means hereinbefore discussed is associated with the nose beam to transfer loads thereto only when the loads are applied to the gear or cantilever support in a direction in line with the axis of the pivoted connections of the link. This feature is accomplished by pivotally connecting the forward end of the link means to a slide element, the latter element being carried in a sleeve member secured in the web of the nose beam. The details of construction and operation of the link means and slide element will be more fully pointed out presently.

Retraction and extension of the landing gear is effected by means of a novel and simple linkage system the details of which will appear during the description of the several views of the drawing.

The invention is illustrated in the accompanying drawings, in which:

Figure 3 is an enlarged sectional view of the connection between the cantilever brace member and the main wing beam, there being shown also a lock means for securing the gear in extended position;

Figure 4 is an enlarged sectional elevation of the rear bearing for the torque shaft of the gear;

Figure 1:
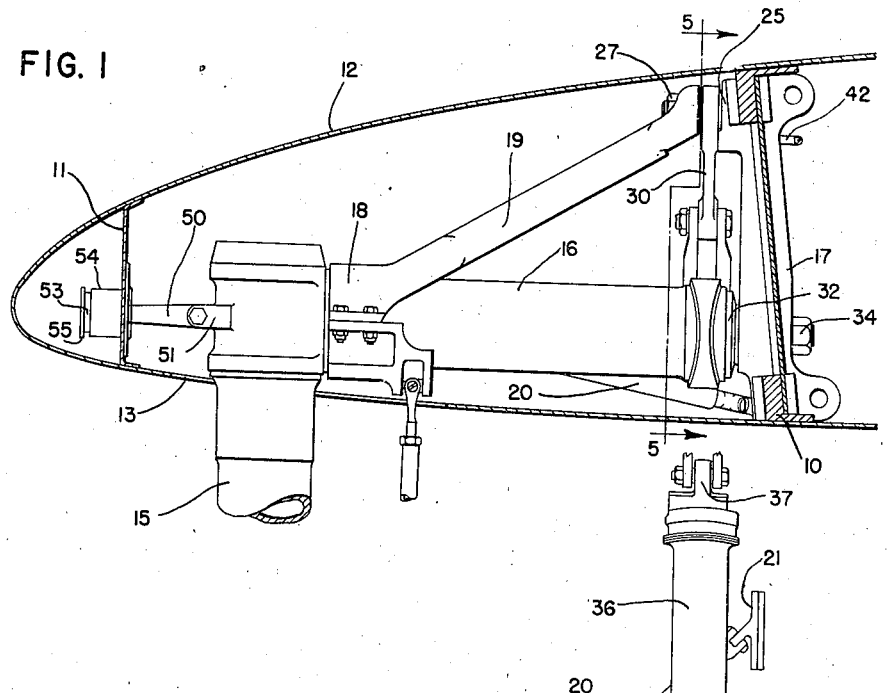
Figure 1 is a sectional view in elevation taken through an aircraft wing just outboard of the landing gear to reveal the details of the landing gear mounting provisions.
Figure 6:
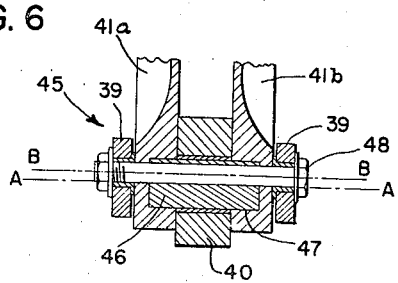

Figure 5 is an elevational detail of the gear retracting mechanism showing its gear extended position (full line) and gear retracted position (dotted line), the view being taken along line 5—5 of Figure 1; and Figure 6 is an enlarged and fragmentary sectional detail of the pivotal connection between the retracting means and the associated link and crank arm of the gear retracting system, the view being taken at line 6—6 of Figure 5.

A preferred embodiment of the present landing gear is arranged to be mounted within an aircraft wing structure which is conveniently illustrated as comprising a main beam or spar 10 of substantial construction and a forwardly spaced leading edge beam 11 of relatively light construction, the usual airfoil envelope being disposed about these wing beams or spars in the usual manner as at 12. Since the landing gear to be described is of a retractable type, the lower skin surface of the wing has been cut away as at 13 to permit the extension and retraction of the gear in the usual manner.

Figure 2:
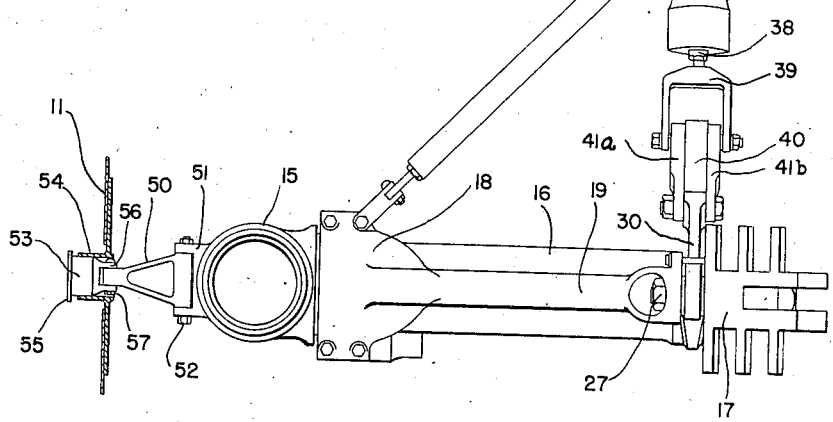
Figure 2 is a top plan view of the landing gear showing further details thereof.

Referring now to Figures 1 and 2 of the drawing it will be observed that the landing gear consists of a main shock strut or oleo 15 which is secured at its upper end to a torque tube 16, the latter member carrying the shock strut at its forward end and being mounted for rotation in a suitable fitting 17 which forms a part of the principal wing spar or beam 10. Immediately to the rear of the upper end of the shock strut 15 there is provided a torque tube bearing 18 which is braced against vertical loads by means of a truss member 19 extending rearwardly and upwardly to a suitable connection with the fitting 17 in the manner clearly illustrated in Figure 1. The pivot bearing 18 is additionally supported against side loads from the shock strut by means of a suitable side brace 20 which extends rearwardly and is suitably secured to the wing spar 10 by means of a fixed bracket 21. This latter detail is clearly illustrated in Figure 2. In the construction just described it will be noted that the landing gear strut 15 is mounted on a full floating cantilever type truss which is constituted by the pivotally mounted torque tube or member 16, the wing beam fitting 17 and the truss element 19. The arrangement of the several elements or members of this truss are sufficient to provide a substantially rigid and strong support for the aircraft when the latter is supported on the shock strut. Furthermore this truss construction is adapted to support the landing gear in its fully retracted position and to resist vertically directed air-loads acting on suitable fairing (not shown) which may be attached to the side of the strut 15 and move therewith when the latter is retracted in a manner to close aperture 13 in the lower surface of the wing. This latter feature of enclosing the landing gear is well understood in the art and therefore no further reference will be made thereto.

Referring now to Figure 3 there is illustrated one means for securing the vertical truss element 19 to the wing fitting 17 as by means of a threaded element 24 carried in an upper and enlarged boss 25 of this fitting. The upper end of truss element 19 is suitably formed to receive the outwardly projecting end portion 26 of this threaded stud 24 and is held in position by means of a nut 27. It will also be noted in connection with this view that there is disposed between the boss 25 and the upper end of truss element 19 a lever arm 30 which is adapted to rotate about the axis of stud 24 upon a suitable bearing surface 31 provided thereon, the swingable arm 30 constituting one member of the gear retracting lever system later to be described.

Turning now to Figure 4 there is illustrated one means for pivotally supporting and mounting the rearward end of the torque shaft 16 on the beam member 17. This is accomplished by providing a member 32 for threading engagement within the end of the torque tube 16, the member 32 being provided with a projecting shaft portion 33 which is journalled on suitable bushings carried by the truss fitting 17 in the manner clearly illustrated in this figure. Axial displacement of the torque shaft 16 is prevented by means of nut 34 threaded over the end portion of the shaft 33.

The gear retracting mechanism herein preferred is illustrated in Figures 5 and 6 and as shown comprises a retracting actuator 36 of hydraulic type which is suitably pivoted by pivot mount 37 on a structural portion of the wing (not shown). The operating connecting rod 38 hereof is provided with a yoke end member 39 adapted to be secured to the crank arm 40 of the torque shaft 16. In addition the lever 30 hereinbefore noted is connected by means of a second pivot lever 41 to the common pivot forming means carried by and between the yoke member 39 and the crank arm 40. As shown in Figure 5 (in full line) the retracting mechanism is in its gear extension position and in such position the links or arms 30 and 41 are arranged in a straight line relation and may be locked or otherwise secured against displacement by a suitable locking pin 42 which is slidably mounted in the wing fitting 17, Figure 3. The pin is adapted to project into a suitable aperture 43 provided near the upper pivoted end of the lever 30. Although not indicated here any suitable manual or automatic means may be associated with the locking pin 42 to effect sliding movement thereof into and out of the locking aperture 43. When it is desired to effect retracting of the landing gear, locking pin 42 is first retracted from aperture 43 in the lever arm 30 and then the hydraulic unit energized whereupon the lever 41 is first rotated in a clock-wise direction to break the dead center position of the levers 41 and 30. Thereafter the crank arm 40 on the torque shaft 16 may be rotated clock-wise to the dotted line position at which point the landing gear has been moved to its fully retracted position. Levers 30 and 41 will then assume the folded positions also indicated in dotted line in the view. In order to accomplish movement of lever 41 a novel eccentric type pivot 45 has been provided for securing the yoke 39, lever 41 and crank arm 40 in operative relationship. This pivot connection is illustrated in detail in Figure 6 in which the crank arm 40 and the pair of side elements 41A and 41B, which together constitute the lever arm 41, carry therebetween a pivot element 46 rotatably mounted in the crank arm 40 and extends outwardly from each side thereof for positionment within suitable recesses 47 formed in each of the elements 41A and 41B in the manner shown. The axis of rotation of this pivot 46 is indicated by the reference line A—A. The yoke member 39 of the operating unit 36 is adapted to embrace the pivotal connection between lever 41 and crank 40 and is in turn pivotally connected thereto by means of a second shaft element 48 which is adapted to extend through a suitable eccentrically formed transverse bore formed in the elements 41A and 41B and the pivot element 46. The axis of the shaft 48 is illustrated by the reference axis B—B. When the yoke member 39 is moved to the right to retract the landing gear a force is applied through element 48 on the link 41 to rotate the latter about its pivot axis A—A. It is by means of this eccentric relationship between the members 46 and 48 that the dead center position assumed by levers 30 and 41 may be broken in order to permit retraction of the landing gear.

A particularly important feature of the present invention has to do with means for stabilizing or supporting the landing gear shock strut against lateral displacement when in its extended position. While the side brace 20 will afford some support for lateral or side loads on the strut 15 it is deemed necessary to provide additional support for the shock strut. Accordingly there is provided a stabilizing means or link 50 (Figures 1 and 2) which is pivotally connected near the upper forward portion of the strut 15 by means of a boss 51 suitably arranged to receive a pivot pin 52 directed substantially transversely to the longitudinal axis of the shock strut. This link 50 articulated about the pivot 52 extends forwardly and is movably connected to the leading edge beam or spar 11 by means of a slider 53 mounted for fore and aft movement in a sleeve member 54 in turn welded or otherwise affixed to the web of the beam 11. The slider 53 is provided with a stop flange 55 in order to limit the inward movement thereof. At the inner end of this member 53 there is provided a bifurcated pivot bearing 56 to which is connected by a pin 57 the forward end of the link 50. The pivot element 57 is also directed substantially parallel to the axis of the pivot pin 52 provided between the link 50 and the boss 51.

Referring again to Figure 1 it will now be evident that with the gear in its extended position vertical loads on the shock strut are primarily taken through the cantilever truss and pass inwardly to the main wing beam or spar 10. However, any vertical deflection of the strut shaft 16, such as can result from improper landings, cannot be transmitted into the leading edge or forward spar 11 due to the articulation of the link member 50 in the manner heretofore described. On the other hand side loads or thrust in a lateral direction on the shock strut 15 may be transmitted in to the leading edge spar 11 through the link 50. Since the axes of articulation of this latter member are arranged parallel to the line of side thrust, the link member 50 is rendered rigid and is effective for resisting loads on the shock strut in a direction transverse to the longitudinal axes thereof.

A further and important feature of the present landing gear is obtained by arranging the link or stabilizer element 50 to rotate with the gear when the latter is moved into the retracted position. Thus the link and the landing gear truss supporting system becomes a rigid structural organization capable of taking vertical loads in the manner of a wing rib member. As a practical matter this arrangement will take the place of at least one of the usual wing ribs. For example, when the landing gear is positioned near the zone of the splice between wing sections, such as the splice between an outer wing panel and the wing center section, the usual or ordinary construction calls for a heavy rib member in order that loads may be transferred therebetween. The necessity for such a splice rib is obviated by constructing and arranging the landing gear system according to the above described arrangement.

Obviously the present landing gear could be used without the stabilizer link means and in which event increased strength of certain parts thereof would be required. But the general and basic features do not require material alterations. Therefore, it should be understood that the landing gear itself presents novel features of this invention.

The foregoing detailed description relates to a preferred embodiment of the present invention. However, it should be well understood that certain modifications and minor changes may be made herein without departing from the scope of the claims hereafter appended.

What is claimed is:

1. In an aircraft having a main wing spar and an auxiliary wing spar, retractable landing gear structure including a shock strut carried by a torque shaft that is disposed between said spars and is supported by the main spar for angular movement about the shaft axis as the strut is moved between substantially upright extended position and substantially horizontal retracted position, a member having a swivel connection with the auxiliary spar, the axis of said swivel connection being aligned with the shaft axis, an articulated connection between said member and said structure adapted to transmit loads radial of said axis between said structure and said member in a plane passing through said axis and substantially normal to the major axis of the shock strut while allowing relative movement of said member and said structure in a second plane passing through said axis at right angles to the first mentioned plane, a crank on said shaft for moving the gear between limit positions wherein said first defined plane is respectively substantially horizontal and substantially vertical, actuator means pivotally attached to said crank for moving the same, a pivot pin providing the pivotal attachment for said means and crank, a foldable linkage system pivotally attached to said crank and to said actuator means and foldable from an extended, straight line position in which the gear is secured in its extended position, and a second pivot pin providing the pivotal attachment for said linkage and crank, the first said pivot pin extending through the second said pivot pin in an eccentric relationship whereby, as said actuator means is operated to move said crank, said eccentrically related pivot pins will coact to initiate folding of said linkage system.

2. In an aircraft having a main wing spar and an auxiliary wing spar spaced therefrom, retractable landing gear structure including a shock strut carried by a torque shaft that is disposed between said spars and is supported by the main spar for angular movement about the shaft axis as the strut is moved between substantially upright extended position and substantially horizontal retracted position, a member having bearing support by the auxiliary spar for angular movement with respect thereto about an axis aligned with the shaft axis, and for movement relative thereto along said axis, and a stabilizing link pivoted to said member and pivoted to said landing gear structure about axes which are normal to the shaft axis and are in a plane substantially normal to the major axis of the strut, whereby substantially horizontal loads only may be transmitted between the said landing gear structure and auxiliary spar by said stabilizing link when the gear is in extended position and substantially vertical loads only may be so transmitted when the gear is in retracted position.

3. In an aircraft having a main wing spar and an auxiliary wing structure member spaced therefrom, retractable landing gear structure including a shock strut carried by a torque shaft that is disposed between said spar and said auxiliary member, said gear structure being supported by the main spar for angular movement about the shaft axis as the strut is moved between substantially upright extended position and substantially horizontal retracted position, a member having bearing support by said auxiliary member for angular movement with respect thereto about an axis aligned with the shaft axis, and for movement relative thereto along said axis, and a stabilizing link pivoted to said member and pivoted to said landing gear structure about axes which are normal to the shaft axis and are in a plane substantially normal to the major axis of the strut, whereby substantially horizontal loads only may be transmitted between said landing gear structure and the auxiliary spar by said stabilizing link when the gear is in extended position and substantially vertical loads only may be so transmitted when the gear is in retracted position.

4. In an aircraft having a main structural member and an auxiliary structural member spaced therefrom, retractable landing gear structure including a shock strut carried by a torque shaft that is disposed between said structural members and is supported by the main structural member for angular movement about the shaft axis as the strut is moved between substantially upright extended position and substantially horizontal retracted position, an element having a swivel connection with the auxiliary structural member, the swivel axis being aligned with the shaft axis, and a stabilizing link pivoted to said element and pivoted to said landing gear structure about axes which are normal to the torque shaft axis and are in a plane substantially normal to the major axis of the strut, whereby substantially horizontal loads only may be transmitted between said landing gear structure and said auxiliary structural member through said stabilizing link when the gear is in extended position and substantially vertical loads only may be so transmitted when the gear is in retracted position.

5. In an aircraft having a beam and an auxiliary support spaced therefrom, retractable landing gear structure including a torque shaft that is disposed between said spar and said auxiliary support, said shaft being supported by the beam for angular movement of approximately one quarter turn about the shaft axis as the gear is moved between its limit positions, a member having a swivel connection with the auxiliary support, the axis of said swivel connection being aligned with the shaft axis, and an articulated connection between said member and said structure, said connection being movable angularly with said shaft and being adapted to transmit loads radial of said axis between shaft and said member in one plane passing through said axis while allowing relative movement of said member and said structure in a second plane passing through said axis at right angles to the first mentioned plane.

6. In an aircraft having a pair of spaced structural members, a retractable landing gear assembly including a part that is disposed between said members and is pivotally supported by one of said members for angular movement of approximately one quarter rotation about the pivot axis as the assembly is moved between extended position and retracted position, an element supported by the other structural member for angular movement with respect thereto about an axis coincident with said first axis, and means connecting said element to the landing gear assembly for angular movement therewith about the pivot axis, said connecting means being articulated in such manner as to provide a connection between the element and landing gear assembly that is rigid in one plane passing through said pivot axis and is flexible in a second plane passing through the pivot axis at right angles to the first mentioned plane.

7. In an aircraft having a main wing spar and an auxiliary wing spar spaced therefrom, a retractable landing gear assembly including a part that is disposed between said spars and is pivoted to the main spar for angular movement of approximately one quarter rotation about the pivot axis as the assembly is moved between extended position and retracted position, a member supported by the auxiliary spar for angular movement with respect thereto about an axis coincident with the pivot axis, and means connecting said member to the landing gear assembly for angular movement therewith about the pivot axis, said connecting means being articulated in such manner as to provide a stabilizing connection between the member and landing gear assembly that is rigid in one plane passing through the pivot axis and is flexible in a second plane passing through the pivot axis at right angles to the first mentioned plane, and said connecting means being so related to the landing gear assembly that the second plane is substantially horizontal when the landing gear is in extended position and substantially vertical when the gear is in retracted position.

8. In an aircraft landing gear mechanism for moving the gear between extended and retracted limit positions, a crank arm for moving the gear, actuator means for moving said crank arm, a pivot pin connecting said means and crank, a foldable linkage system pivotally attached to said crank and to said actuator means and foldable from an extended, straight line position in which the gear is in one limit position, and a second pivot pin connecting said linkage and crank, the first mentioned pivot pin extending through the second said pivot pin in an eccentric relationship so related to said linkage system that as said actuator means is operated to move said crank, said eccentrically related pivot pins will coact to initiate folding of said linkage system.

9. In a retractable landing gear mechanism for aircraft, a member having a pivotal connection to the aircraft, actuator means for swinging said member about the axis of said pivotal connection in moving the gear between extended and retracted limit positions, a pair of pivoted links, one link of which is pivoted to the aircraft, said links being in extended, straight line relation to each other in one limit position of the gear, and an eccentric pin unit pivotally connecting the other link to said member on one pivot axis and pivotally connecting the actuator means to said other link on an axis eccentric to said first pivot axis, whereby initial movement of the actuator means in one direction will swing said second link about said first pivot axis to initiate folding of said pair of links.

10. In a retractable landing gear mechanism for aircraft, a first element and a second element pivotally connected and a third element pivotally connected to the aforementioned elements for initially moving the first element about the axis of its pivotal connection to the second element and thereafter moving both of said elements, the pivotal connection means comprising a pin having co-axial surfaces in bearing engagement with the first element and one of the second and third elements, said pin having an opening therethrough and a second pin extending through said opening and having co-axial surfaces eccentric of the first mentioned co-axial surfaces and having bearing engagement with the first element and with the other one of said second and third elements.

11. The combination in an aircraft landing gear mechanism for moving the gear between extended and retracted positions, a crank for moving the gear, actuator means having a pivot connection to said crank for moving the same, and a foldable linkage system having a pivot connection to said crank and to said actuator means and foldable from an extended, straight line position in which the gear is secured in its extended position, the axis of the first mentioned pivot connection being eccentric to the axis of the second mentioned pivot connection in such a direction that as said actuator means is operated to move said crank, said eccentrically related pivot axes become effective to fold said foldable linkage from its extended straight line position and thereby permit retraction of the landing gear.

12. The combination in an aircraft landing gear mechanism for moving the gear between extended and retracted positions, a crank for moving the gear, actuator means pivotally attached to said crank for moving the same, a pivot pin providing the pivotal attachment for said means and crank, a foldable linkage system pivotally attached to said crank and to said actuator means and foldable from an extended, straight line position in which the gear is secured in its extended position, and a second pivot pin providing the pivotal attachment for said linkage and crank, the first said pivot pin extending through the second said pivot pin in an eccentric relationship whereby, as said actuator means is operated to move said crank, said eccentrically related pivot pins will coact to initiate folding of said linkage system and thereby permit retraction of the landing gear.

ARTHUR N. LAPPIN.
ALLAN E. BJERKE.

REFERENCES CITED

The following references are of record in the file of this patent:

UNITED STATES PATENTS

| Number | Name | Date |
|---|---|---|
| 2,005,980 | Minshall | June 25, 1935 |
| 2,318,568 | Wintermute et al. | May 4, 1943 |

FOREIGN PATENTS

| Number | Country | Date |
|---|---|---|
| 488,059 | Great Britain | June 30, 1938 |